US 007489943B2

(12) United States Patent
Jones (10) Patent No.: US 7,489,943 B2
(45) Date of Patent: Feb. 10, 2009

(54) SCHEDULING CALLS IN DOWNLINK TRANSMISSIONS (75) Inventor: Robert Jones, Swindon (GB)

(73) Assignee: Alcatel-Lucent USA Inc., Murray Hill, NJ (US)

(*) Notice: Subject to any disclaimer, the term of this patent is extended or adjusted under 35 U.S.C. 154(b) by 766 days.

(21) Appl. No.: 11/025,667

(22) Filed: Dec. 29, 2004

(65) Prior Publication Data
US 2006/0142040 A1 Jun. 29, 2006

(51) Int. Cl.
H04B 7/00 (2006.01)
(52) U.S. Cl. .................. 455/522; 455/68; 455/69; 455/126; 455/127.1
(58) Field of Classification Search ......... 455/450–453, 455/522, 67.11, 68, 69, 115.3, 126, 127.1; 370/395.21–395.42, 331, 320, 335, 342, 370/318, 392, 252, 276, 280; 375/147, 130; 270/311
See application file for complete search history.

(56) References Cited

U.S. PATENT DOCUMENTS

| 5,956,644 | A | * | 9/1999 | Miller et al. | 455/453 |
|---|---|---|---|---|---|
| 6,246,965 | B1 | * | 6/2001 | Cockerham et al. | 702/85 |
| 6,347,224 | B1 | * | 2/2002 | Smyth et al. | 455/406 |
| 6,362,685 | B1 | * | 3/2002 | Vagher | 330/124 R |
| 6,522,636 | B1 | * | 2/2003 | Hogberg et al. | 370/316 |
| 6,801,512 | B1 | * | 10/2004 | Cudak et al. | 370/332 |
| 6,807,405 | B1 | * | 10/2004 | Jagger et al. | 455/296 |
| 7,024,203 | B1 | * | 4/2006 | Naghian | 455/453 |
| 7,068,597 | B1 | * | 6/2006 | Fijolek et al. | 370/230 |
| 7,142,867 | B1 | * | 11/2006 | Gandhi et al. | 455/453 |
| 7,158,796 | B2 | * | 1/2007 | Tiedemann et al. | 455/453 |
| 7,162,250 | B2 | * | 1/2007 | Misra | 455/453 |
| 7,173,904 | B1 | * | 2/2007 | Kim | 370/230 |

(Continued)

FOREIGN PATENT DOCUMENTS

WO    WO 00/49824    8/2000

(Continued)

OTHER PUBLICATIONS

European Search Report for EP05257700.4 dated May 17, 2006.

(Continued)

Primary Examiner—Matthew D. Anderson
Assistant Examiner—Dominic E Rego (57) ABSTRACT The present invention provides a method and an apparatus for scheduling a call for a wireless device in a transmission, e.g., a High Speed Downlink Packet Access transmission from a communication node associated with a network. The method comprises determining a current and a future traffic load on a downlink channel over a plurality of communication periods and adjusting a transmit power of the transmission from the communication node across at least two communication periods of the plurality of communication periods based on the current and future traffic loads. Base station software including a power step limiting algorithm and a scheduler may ramp the transmitted power from a transmitter slowly over several frames as data transmission increases and/or decreases with time at a base station. By smoothing out a transmitted power envelope a carrier may operate at a maximum data and power level during a busy time period. In this manner, an increase may be avoided in a saturated power of a power amplifier and the effects of an increased peak-to average power ratio on a power step limiting algorithm and a pre-distortion unit may be reduced.

30 Claims, 5 Drawing Sheets

U.S. PATENT DOCUMENTS

| | | | |
|---|---|---|---|
| 7,221,944 B2* | 5/2007 | Kanerva | 455/452.1 |
| 7,321,772 B2* | 1/2008 | Morimoto et al. | 455/453 |
| 2002/0098871 A1* | 7/2002 | Hildebrand et al. | 455/561 |
| 2003/0073424 A1* | 4/2003 | Nunally | 455/404 |
| 2003/0214915 A1* | 11/2003 | Ishikawa | 370/252 |
| 2004/0009780 A1 | 1/2004 | Dick et al. | 455/509 |
| 2004/0038682 A1* | 2/2004 | Persson et al. | 455/436 |
| 2004/0228349 A1* | 11/2004 | Vrzic et al. | 370/395.4 |
| 2004/0229621 A1* | 11/2004 | Misra | 455/445 |
| 2005/0140435 A1* | 6/2005 | Kodim | 330/129 |
| 2005/0206447 A1* | 9/2005 | Yamazaki et al. | 330/129 |
| 2006/0258395 A1* | 11/2006 | Cave et al. | 455/552.1 |
| 2006/0293836 A1* | 12/2006 | Mintz | 701/117 |

FOREIGN PATENT DOCUMENTS

| | | |
|---|---|---|
| WO | WO 2004/088899 | 10/2004 |

OTHER PUBLICATIONS

"3G Evolution Towards High Speed Downlink Packet Access: The introduction of HSDPA will enhance 3G mobile systems by offering higher data rates in the downlink direction. The Evolium multi-standard base station architecture is ready for this evolution," by Haberland, et al, p. 3, right-hand column and p. 5, left-hand column, Oct. 2003.

* cited by examiner

SCHEDULING CALLS IN DOWNLINK TRANSMISSIONS

BACKGROUND OF THE INVENTION

1. Field of the Invention

This invention relates generally to telecommunications, and more particularly, to wireless communications.

2. Description of the Related Art

Use of mobile services is on the increase. Until recently, however, most wireless devices have been used only for voice transmissions, but many new wireless devices deliver both voice and data communications. While more and more data is shifted between networks, the users of these wireless devices expect a higher service quality without delay of applications and packet loss, for example, in Internet based wireless multimedia communications and services. To keep up with such a demand of bandwidth for wireless communications, network providers are increasingly deploying wireless mobile communication systems that carry voice and data simultaneously to a single user.

For example, one such technique that may multiplex voice and data referred to as High Speed Downlink Packet Access (HSDPA) is based on a Wideband Code Division Multiple Access (WCDMA) specification for Universal Mobile Telecommunications Systems (UMTS). This technique enables user peak data rates and a quality of service for downlink packet data services. A HSDPA transmission may allocate up to twenty fixed power codes per carrier. The HSDPA transmission may set a data rate for a wireless communication depending on the results of channel quality estimation. The HSDPA transmission may assign codes to a user on a 2 ms frame rate on a first come first served basis and as a function of the amount of data to be transmitted. However, this technique may result in a significantly large step changes in transmit power of a transmitter at a 2 ms frame rate intervals.

Moreover, the HSDPA transmission may add significantly to a peak-to-average power ratio (PAR) of a transmitted signal because some user equipments (UEs) are unable to process adjacent data frames. For instance, if such a UE receives a large data file, the transmitter sending the data may experience a 8 dB step in transmit power on a 2 ms frame rate. The unclipped PAR increases from approximately 10 dB for a voice transmission, to about 11.6 dB. This unclipped PAR increase is likely to have a substantial impact on peak limiting algorithms, power amplifiers and pre distortion units of a transceiver, such as a base transceiver station (BTS) at a base station, i.e., a Node-B in a wireless mobile telecommunication system.

The present invention is directed to overcoming, or at least reducing, the effects of, one or more of the problems set forth above.

SUMMARY OF THE INVENTION

In one embodiment of the present invention, a method is provided for scheduling a call for a wireless device in a transmission from a communication node associated with a network. The method comprises determining a current and a future traffic load on a downlink channel over a plurality of communication periods and adjusting a transmit power of the transmission from the communication node across at least two communication periods of the plurality of communication periods based on the current and future traffic loads.

In another embodiment, a communication node associated with a network comprises a scheduler to schedule a call for a wireless device in a transmission from the communication node. The communication node further includes a transceiver to ramp a transmit power of a transmitted signal associated with the call, e.g., in a relatively slower manner, over a plurality of communication periods. The communication node may further include a storage coupled to the scheduler. The storage may store instructions to determine a current and a future traffic load on a downlink channel over the plurality of communication periods and to adjust the transmit power of the transmission from the communication node across at least two communication periods of the plurality of communication periods based on the current and future traffic loads.

In yet another embodiment, a telecommunication system may comprise a base station associated with a digital cellular network and a base transceiver station coupled to the base station. The base transceiver station may include a scheduler to schedule a call for a wireless device in a transmission from the base station. The base transceiver station may further include a transmitter to ramp a transmit power of a transmitted signal associated with the call, e.g., in a relatively slower manner over a plurality of communication periods. A storage may be coupled to the scheduler. The storage may store instructions to determine a current and a future traffic load on a downlink channel over the plurality of communication periods and to adjust the transmit power of the transmission from said base station across at least two communication periods of the plurality of communication periods based on the current and future traffic loads.

In still another embodiment, an article comprising a computer readable storage medium storing instructions that, when executed cause a system to determine a current and a future traffic load on a downlink channel over a plurality of communication periods for scheduling a call for a wireless device in a transmission from a communication node associated with a network and adjust a transmit power of the transmission from the communication node across at least two communication periods of the plurality of communication periods based on the current and future traffic loads.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and apparatus may be used to schedule calls for one or more wireless devices in a transmission from a communication node associated with a network. In one embodiment, calls may be scheduled for user equipment (UE) or mobile stations in a High Speed Downlink Packet Access (HSDPA) transmission based on a Wideband Code Division Multiple Access (WCDMA) specification for Universal Mobile Telecommunications Systems (UMTS) protocol from a base station (e.g., a Node-B) associated with a digital cellular wireless network. Base station software determines a current and a future traffic load on a downlink channel over a plurality of communication periods to adjust a transmit power of the transmission from the communication node across at least two communication periods of the plurality of communication periods based on the current and future traffic loads. A scheduler may use the current and the impending traffic load or data to ramp the transmitted power slowly over several frames as data transmission increases and/or decreases with time at the base station. In this manner, an increase may be avoided in a saturated power of a power amplifier which is designed for use with HSDPA and the effects of an increased peak-to average power ratio (PAR) on a power step limiting algorithm and a pre-distortion unit may be reduced. Accordingly, smoothing out of a transmitted power envelope may enable a carrier to operate at a maximum data and power level, as determined by a quality of a transmission path during a busy time period.

Figure 1:
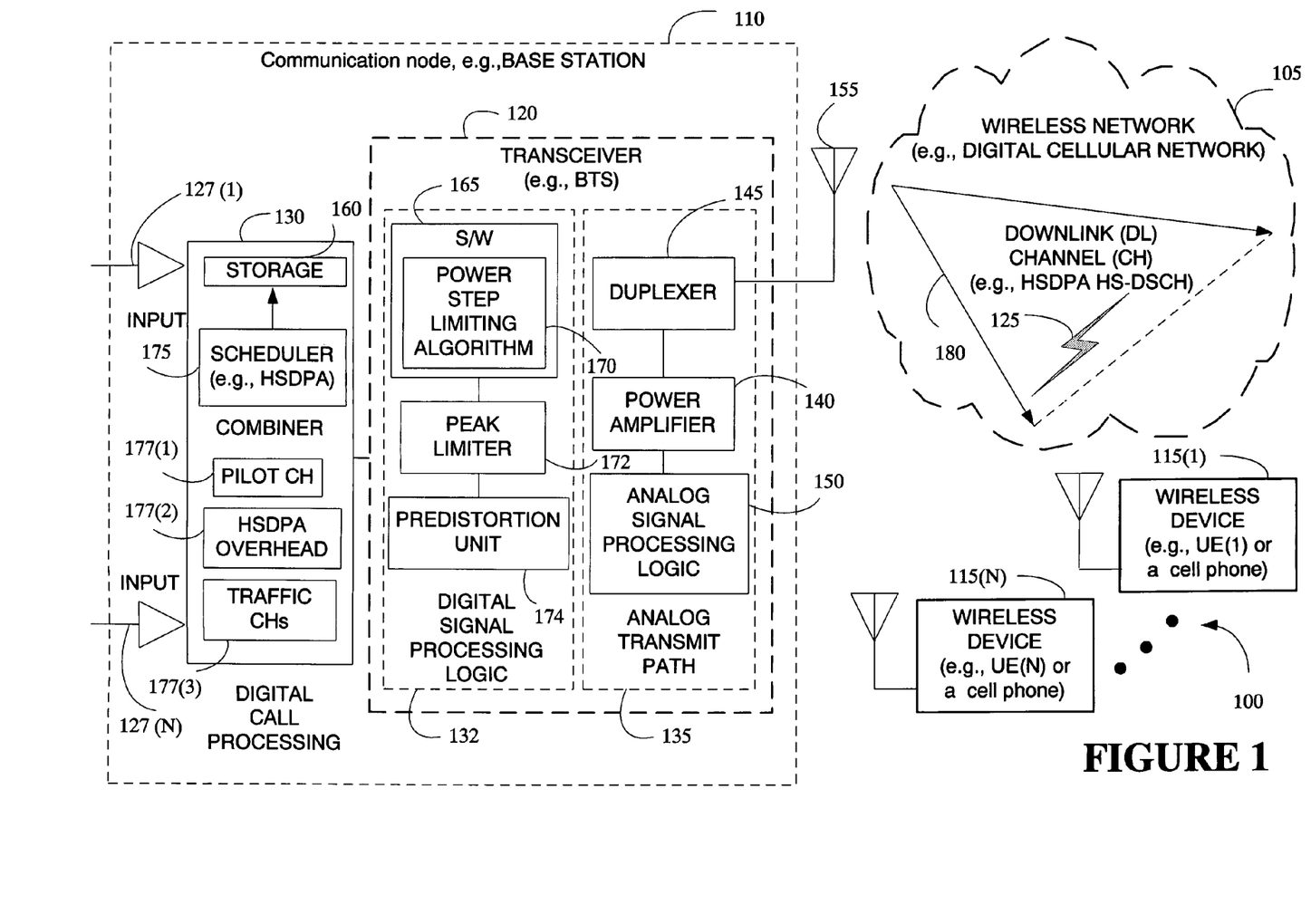
FIG. 1 illustrates a telecommunication system including a wireless network to communicate with a base station having a transceiver including a scheduler to adjust a transmit power of a transmission on a downlink channel from a communication node across at least two communication periods based on current and future traffic loads to schedule calls for wireless devices according to one illustrative embodiment of the present invention.

Referring to FIG. 1, a telecommunication system 100 includes a wireless network 105 to communicate with a communication node, such as a base station 110 (e.g., a Node-B) to schedule calls for a plurality of user equipments (UEs, UE (1-N)), i.e., a first and second wireless device 115(1) and 115(N) according to one illustrative embodiment of the present invention. In this example, only two user equipments are shown for purposes of simplicity, however, it is to be understood that the base station 110 may service a large number of wireless devices across one or more cells of the telecommunication system 100. A cell may be divided into multiple sectors to provide a service or network coverage area for a digital cellular network in the telecommunication system 100. The digital cellular network may be defined at least in part by a Universal Mobile Telecommunication System (UMTS) protocol.

The telecommunication system 100 may be defined, at least in part, by a Third Generation (3G) mobile communication standard based on a Universal Mobile Telecommunications System (UMTS) protocol, in one embodiment. For example, the telecommunication system 100 may operate according to a Code Division Multiple Access (CDMA) standard or a Global System for Mobile Communications (GSM) standard, which is a land mobile pan-European digital cellular radio communications system. In this way, the transceiver 120 may send or receive, voice, data, or a host of voice and data services in different generations of the wireless network 105, including a digital cellular network based on one or more standards including UMTS and 3G-1X (CDMA) 2000), as well as IS-95 CDMA, GSM and Time Division Multiple Access (TDMA).

Consistent with one embodiment, the base station 110 may comprise a transceiver 120, for example, a base transceiver station (BTS) to ramp a transmit power of a transmitted signal 125 associated with a call in a relatively slower manner over a plurality of communication periods. In one embodiment, the transceiver 120 may be defined at least in part by a Universal Mobile Telecommunication System (UMTS) protocol. Furthermore, the base station 110 may include a plurality of input ports 127 (1-N) combined by a combiner 130 for the transceiver 120 for conventional signal processing. The transceiver 120 of the base station 110 may include a digital signal processing logic 132 to perform baseband operations for handling wireless communications and an analog transmit path 135 to transmit the wireless communications to the first and second wireless devices 115(1-N).

The combiner 130 may comprise a storage 160 that may store a scheduler 175 to schedule a call for at least one of the first and second wireless devices 115(1-N) in a transmission from the base station 110. For digital signal processing, the combiner 130 may process a conventional pilot channel (CH) 177(1), an overhead 177(2) associated with HSDPA calls and one or more traffic channels (CHs). The scheduler 175 may schedule the HSDPA calls for a down-link transmission in which an admission rate may depend on traffic volume in a transmit path. If a relatively low traffic occurs, the scheduler 175 may step the HSDPA traffic, code by code until a maximum transmit power (Pmax) is reached for the transceiver 120. That is, admission may be stepped code by code towards the Pmax by scheduling the HSDPA codes to gradually increase the transmit power of the transceiver 120.

The digital signal processing logic 132 may comprise software (S/W) 165 that includes an algorithm 170, such as a power step limiting algorithm that limits a peak in the transmit power of the transmitted signal 125. The digital signal processing logic 132 may further include a peak limiter 172, such as a peak limiting algorithm that may be used to limit the peak-to-average ratio of the transmitted signal, for all signals in a TX chain. A pre-distortion unit 174 of the digital signal processing logic 132 may correct for a change in one or more characteristics of the analog transmit path 135 relative to a pre-determined threshold.

The analog transmit path 135 may comprise an analog signal processing logic 150 capable of providing radio frequency (RF) processing for a wireless transmission. The analog transmit path 135 may further comprise a conventional duplexer 145 coupled to the power amplifier 140 that may be linearized via the pre-distortion unit 174 or any other method of transmit chain or power amplifier linearization known to those skilled in the art. The power amplifier 140 may amplify a modulated signal to provide a desired output power level for a wireless transmission. To transmit and/or receive the wireless transmission at the base station 110, in the telecommunication system 100, an antenna 155 may be coupled to the duplexer 145.

In operation, the S/W 165 may cause scheduling of the calls, such as scheduling HSDPA calls in a manner which may minimize a potential adverse effect on the power step limiting algorithm 170, the power amplifier 140 and/or the pre-distortion unit 150, in one embodiment. To this end, the S/W 165 may comprise instructions that determine a current and a future traffic load on a downlink channel over the plurality of communication periods. In this way, the S/W 165 may cause the analog transmit path 135 to adjust the transmit power of the transmission from the base station 110 across at least two communication periods of the plurality of communication periods based on the current and future traffic loads, in one embodiment.

To maintain a relatively higher data rate over for the transmitted signal 125, the wireless network 105 including wireless local area network (WLAN), Bluetooth, Global System of Mobile Communications (GSM)/General Packet Radio Service (GPRS), wideband code division multiple access (WCDMA), cdma2000, Wireless Application Protocol (WAP) and i-mode, the telecommunication system 100 may multiplex voice and data form multiple users, i.e., users of the first and second wireless devices 115(1-N). For example, based on a WCDMA specification for Universal Mobile Telecommunications Systems (UMTS), the telecommunication system 100 may provide a cellular system with a large coverage area that is designed for multimedia communications including high quality images and video, and access to services with high data rates.

From the base station 110, a call may be scheduled to a wireless device, e.g., the first and second wireless devices 115(1-N) on the transmitted signal 125 in a downlink (DL) channel (CH) 180 using typical modulation techniques. For scheduling the call in a downlink transmission, a high speed shared information channel (HS-SICH) in high speed downlink packet access (HSDPA) may be used. For example, this scheduling of calls in downlink transmissions from the base station 110 may use modulation techniques including time division duplex (TDD) and/or frequency division duplex (FDD) techniques.

Figure 2:
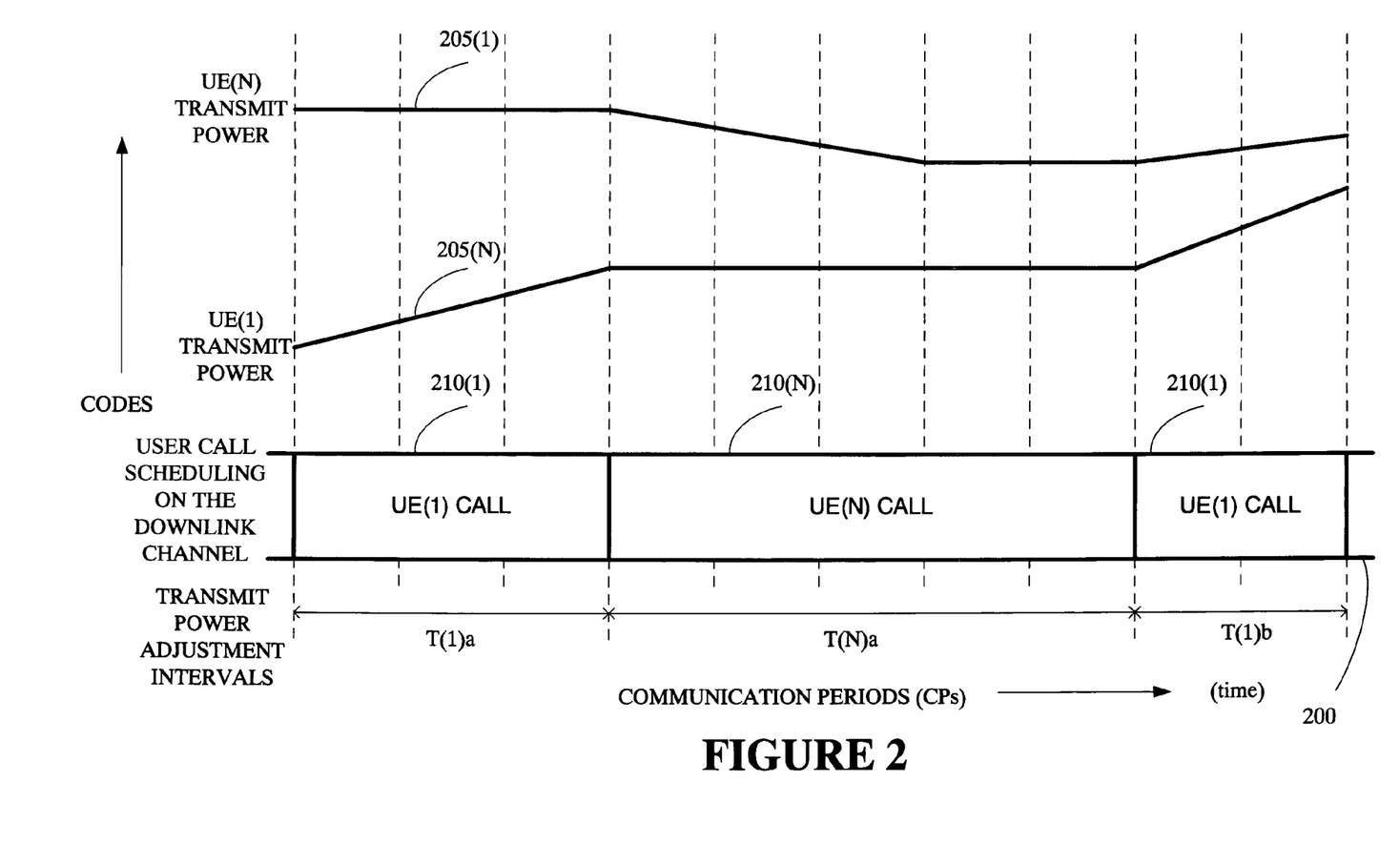
FIGS. 2 illustrates user call scheduling and transmit power adjustment on the downlink channel shown in FIG. 1 for High Speed Downlink Packet Access (HSDPA) consistent with the WCDMA specifications in accordance with an exemplary embodiment of the present invention.

Turning now to FIG. 2, user call scheduling and transmit power adjustment is illustrated on the downlink channel shown in FIG. 1 for HSDPA consistent with the WCDMA specification in accordance with an exemplary embodiment of the present invention. As shown, a HSDPA transmission 200 in the downlink channel 180 may be based on an assignment of timeslots for a high speed shared information channel (HS-SICH), each wireless device, e.g., user equipment (UE), such as a cell phone may be assigned different codes. A communication node, e.g., the base station 110, such as a Node B may distinguish the presence of the transmitted codes for each user equipment UE(1-N), i.e., the first and second wireless devices 115(1-N).

In operation, the base station 110 may adjust the transmit powers 205(1-N), respectively, of the user equipment UE(1-N) in the HSDPA transmission 200 on the downlink channel 180 across at least two communication periods (CPs) of a plurality of communication periods based on current and future traffic loads. The scheduler 175 may schedule calls for users, i.e., UE (1) CALL 210(1) and UE (N) CALL 210(N) on the downlink channel 180. For the UE (1) CALL 210(1), the HSDPA transmission 200 shows a first and a second transmit power adjustment interval T(1)$a$, T(1)$b$ across three and two communication periods (CPs), respectively. Likewise, a transmit power adjustment interval T(N)$a$ is depicted for the UE (N) CALL 210(N) across five communication periods. For example, this HSDPA transmission 200 may use a communication period of 2 ms as a transmission time interval (TTI) of the transmit power adjustment intervals, in one embodiment.

Using the HSDPA transmission 200, the base station 110 may provide a wireless service by transmitting to and/or receiving information from the first and second wireless device 115(1) and 115(N), i.e., a plurality of mobile stations, e.g., cellular phones, in a cell. Specifically, the scheduler 175 may use the current traffic load or data and the impending traffic load or data to ramp the transmitted power slowly over several frames as the requirement for data increases and/or decreases with time.

The power step limiting algorithm 170 may use a ramping function to assign HSDPA codes progressively until a power limit, such as a maximum power is reached. Generally, a HSDPA code has a fixed power and channel estimation determines a desired energy level per bit to meet a probability of intercept. This desired energy level per bit may in turn be used to set a modulation type, i.e., a Quadrature Amplitude Modulation (QAM) technique or a Quadrature Phase Shift Keying (QPSK) technique, as two examples.

When connected, an HSDPA user equipment, e.g., the first wireless device 115(1) may periodically send a channel quality indicator (CQI) to the base station 110, i.e., the Node-B, indicating a particular data rate that the HSDPA user equipment may support under its current radio conditions. The HSDPA user equipment may also send an acknowledgement (ACK/NACK) for each packet such that the base station 110 may initiate retransmissions at an appropriate time. With the channel quality measurements available for each user equipment in a cell, the scheduler 175 may schedule data among the users, according to one specific embodiment.

While on a call, for example, a user may download packet data over the HSDPA transmission 200. The HSDPA transmission 200 may offer peak data rates up to 10 Megabit or million bits per second (Mbit/s or Mbps), such as 2 Mbit/s. A third group project partnership (3GPP) standard provides for HSDPA details on all layers of the HSDPA transmission 200. This HSDPA transmission 200 may use an adaptive modulation and coding (AMC), multi-code transmission, fast physical layer (L1) hybrid ARQ (H-ARQ), and moves a packet scheduler from a radio network controller (RNC) to a Node-B. The HSDPA transmission 200 may use packet scheduling techniques where a user data rate may be adjusted to match any instantaneous radio channel conditions.

Figure 3:
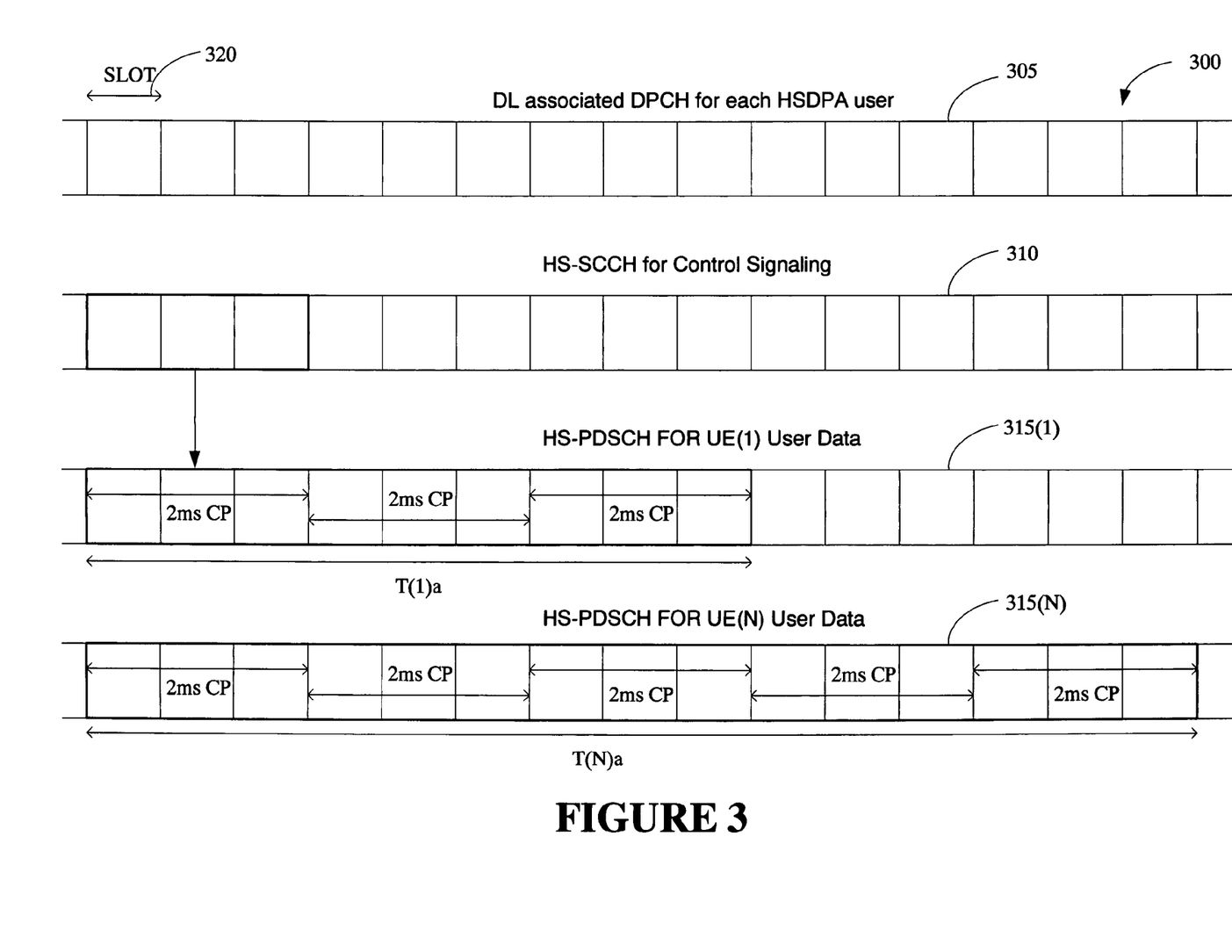
FIG. 3 depicts a HSDPA channel structure for the downlink channel shown in FIG. 1 consistent with one embodiment of the present invention.

FIG. 3 depicts a stylized representation of a HSDPA channel structure 300 for the downlink channel 180 shown in FIG. 1 consistent with one embodiment of the present invention. The HSDPA channel structure 300 may comprise a Downlink Dedicated Physical Channel (DPCH) 305 associated with the downlink channel 180 for each HSDPA user, i.e., the first and second wireless device 115(1-N) users. The HSDPA channel structure 300 may further comprise a High Speed-Shared Control Channel (HS-SCCH) 310 for control signaling. In addition, for UE (1) user data, the HSDPA channel structure 300 may include a High Speed-Physical Downlink Shared Channel (HS-PDSCH) 315(1) and for UE (N) user data a HS-PDSCH 315(N).

Using the HSDPA channel structure 300, the HSDPA transmission 200 shown in FIG. 2 may assign codes to a user on a 2ms frame rate without resulting in a significantly large step changes in the transmit power of the analog transmit path 135 shown in FIG. 1 at a 2 ms frame rate intervals. Each of these channels of the HSDPA channel structure 300 may comprise a slot 320, such as a timeslot for the HSDPA transmission 200. However, channel structures other than the HSDPA channel structure 300, capable of combining or multiplexing voice and/or data in the transmitted signal 125 from the base station 110 for multiple users, may be deployed to render one or more wireless services in different embodiments without deviating from the spirit of the present invention.

Figure 4:
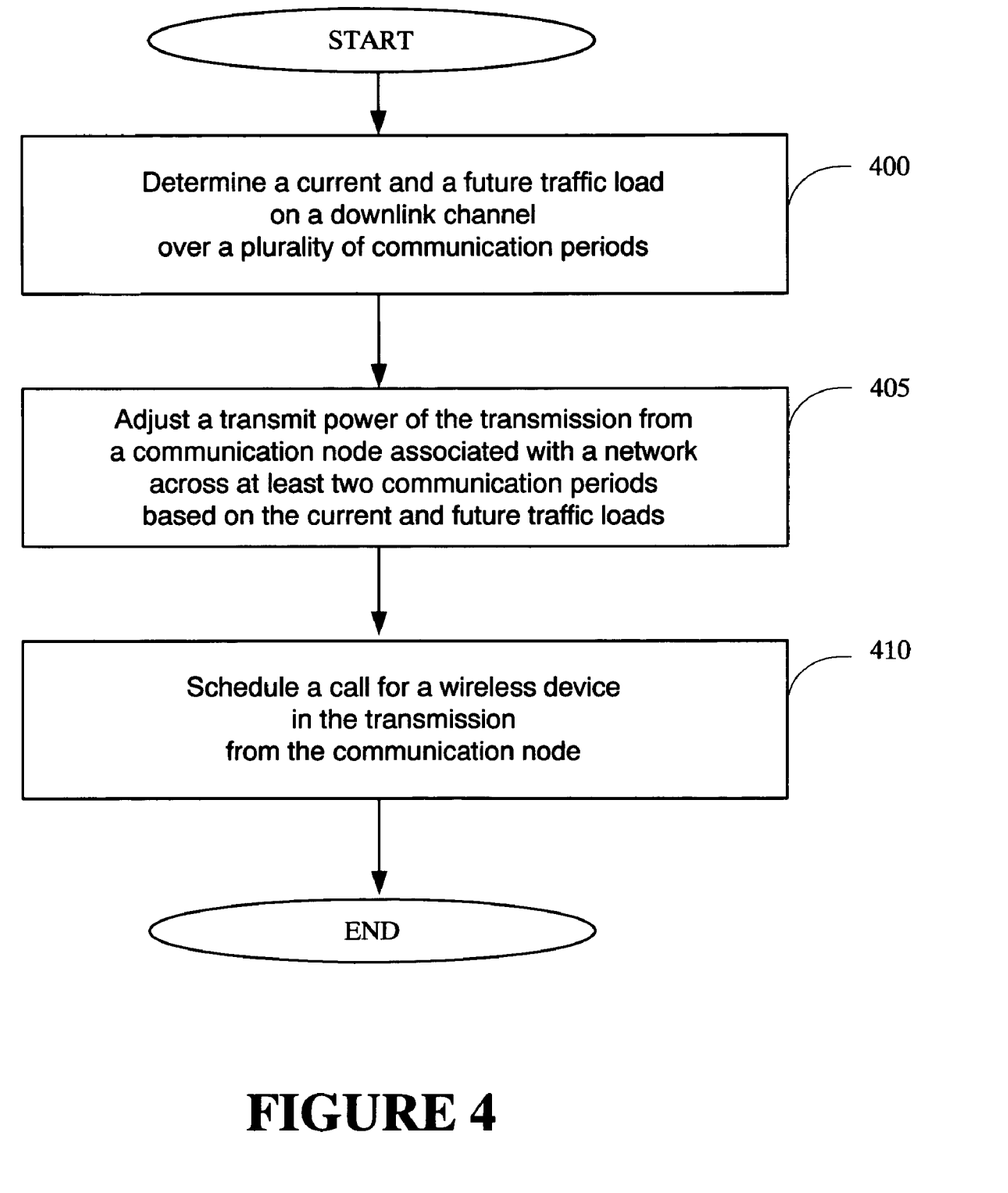
FIG. 4 illustrates a stylized representation for implementing a method of scheduling a call for a wireless device in a transmission from a communication node associated with a network on the HSDPA channel structure for the downlink channel shown in FIG. 3 according to one illustrative embodiment of the present invention.

As shown, FIG. 4 illustrates a stylized representation for implementing a method of scheduling a call for a wireless device, such as the first wireless device 115(1) according to one illustrative embodiment of the present invention. That is, in a transmission, e.g., the HSDPA transmission 200, the base station 110 associated with the wireless network 105 may schedule the call on the HSDPA channel structure 300 for the downlink channel 180 shown in FIG. 3. At block 400, the base station 110, using the S/W 165 may determine a current and a future traffic load on the downlink channel 180 over a plurality of communication periods, such as shown in FIG. 2. The base station 110 may adjust a transmit power of the transmission, e.g., the HSDPA transmission 200 across at least two communication periods of the plurality of communication periods based on the current and future traffic loads, at block 405. In this manner, as indicated in block 410, the base station 110 using the power step limiting algorithm 170 and the scheduler 175 may schedule a call for a wireless device, e.g., the first wireless device 115(1) in the transmission from the base station 110.

Figure 5:
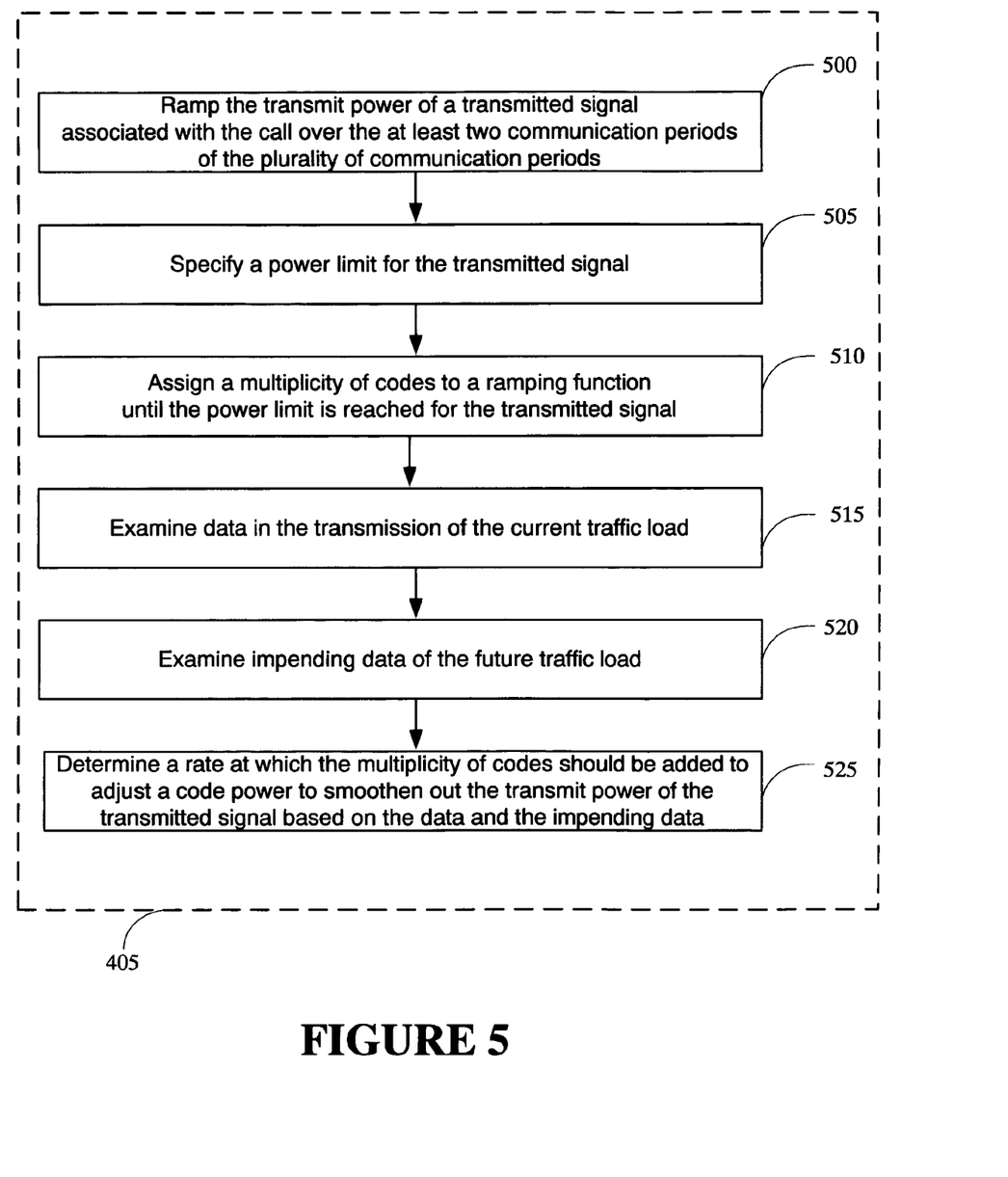
FIG. 5 illustrates a stylized representation for implementing a method of ramping a transmit power of a transmitted signal associated with a call over at least two communication periods of a plurality of communication periods on the HSDPA channel structure for the downlink channel shown in FIG. 3 in accordance with one embodiment of the present invention.

Referring to FIG. 5, a stylized representation of implementing a method is illustrated for slowly increasing a transmit power using the power step limiting algorithm 170 and the scheduler 175 in accordance with one embodiment of the present invention. At block 500, the transmit power of the transmitted signal 125 associated with the call may be ramped over at least two communication periods of the plurality of communication periods on the HSDPA channel structure 300 for the downlink channel 180. At block 505, a power limit, such as a maximum power for the transmitted signal 125 may be specified. A multiplicity of codes, as shown in FIG. 2, may be assigned to a ramping function until the power limit is reached for the transmitted signal 125, in block 510.

At block 515, data in the transmission of the current traffic load may be examined. Impending data of the future traffic load on the downlink channel 180 may be examined as well, at block 520. By checking data in the transmission, i.e., the current traffic load and impending data of the future traffic load, in one embodiment, the S/W 165 may determine a rate at which codes may be added. For example, for a 1 dB power change, the number of codes added may increase at each step. Thus, the power amplifier 140 may be presented with a ramp function change in power for the telecommunication system 100 which uses HSPDA. That is, in a wireless mobile telecommunication system without a benefit of background, lower rate traffic on the same channel as the HSDPA traffic, such a step function in the composite traffic will be less than that contributed by the HSDPA channel alone. Use of the S/W 165, in one embodiment, may substantially avoid an increase in a saturated power of the power amplifier 140 which is designed for use with HSDPA and the effects of an increased PAR on the power step limiting algorithm 170 and the predistortion unit 150.

Finally, at block 525, a rate may be determined by the S/W 165 at which the multiplicity of codes should be added to adjust a code power to smoothen out the transmit power of the transmitted signal 125 based on the current data and the impending data. Accordingly, this smoothing out of a transmitted power envelope may have a minimal impact on the data capacity, except for a first few frames going into a busy session of data transmission. That is, during a busy time period, a carrier may operate at a maximum data level and a maximum power level, as determined by a quality of a transmission path. Therefore, a spectral regrowth of the power step limiting algorithm 170 and the power amplifier 140 may not get affected by relatively slow ramp changes in the transmit power compared to step changes that may occur under a conventional scheduling algorithm. The spectral regrowth is a significant distortion mechanism in nonlinear devices, particularly for the power amplifier 140 handling varying envelope signals in applications, such as wireless.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method of power control for a call involving a wireless device in a transmission over a downlink channel from a communication node associated with a network to the wireless device, the method comprising:

determining a current traffic load on the downlink channel during a current communication period, wherein transmission on the downlink channel occurs at a first power level during the current communication period;

estimating a future traffic load on the downlink channel for each of a plurality of future communication periods following the current communication period; and adjusting a transmit power of said transmission from said communication node by smoothly varying the transmit power from the first power level to a second power level across at least two communication periods of said plurality of communication periods, wherein the second power level is determined based on said current and future traffic loads.

2. A method, as set forth in claim 1, wherein adjusting a transmit power of said transmission from said communication node further comprising:

ramping the transmit power of a transmitted signal associated with said call over said at least two communication periods of said plurality of communication periods.

3. A method, as set forth in claim 1, wherein ramping the transmit power of a transmitted signal further comprising:

specifying a power limit for the transmitted signal; and assigning a multiplicity of codes to a ramping function until the power limit is reached for the transmitted signal.

4. A method, as set forth in claim 1, further comprising:

causing scheduling of said call on said downlink channel to reduce a potential adverse effect on an algorithm that limits a peak in the transmit power of the transmitted signal.

5. A method, as set forth in claim 1, further comprising:

causing scheduling of said call on said downlink channel to reduce a potential adverse effect on a pre-distortion unit.

6. A method, as set forth in claim 1, further comprising:

causing scheduling of said call on said downlink channel to reduce a potential adverse effect on a power amplifier.

7. A method, as set forth in claim 6, further comprising:

presenting said power amplifier with a ramp change in the transmit power for a high speed downlink packet data access on said downlink channel to avoid an increase in a saturated power of said power amplifier and an increase in a peak-to-average power ratio.

8. A method of power control for a call involving a wireless device in a transmission from a communication node associated with a network, the method comprising:

determining a current traffic load and estimating a future traffic load on a downlink channel over a plurality of communication periods; and adjusting a transmit power of said transmission from said communication node across at least two communication periods of said plurality of communication periods based on said current and future traffic loads, wherein adjusting the transmit power of said transmission further comprising:

examining data in said transmission of said current traffic load;

examining impending data of said future traffic load;

based on said data and said impending data, determining a rate at which said multiplicity of codes should be added to adjust a code power to smoothen out the transmit power of the transmitted signal;

specifying a power limit for the transmitted signal; and assigning a multiplicity of codes to a ramping function until the power limit is reached for the transmitted signal.

9. A method, as set forth in claim 8, further comprising:

sequentially allocating said multiplicity of codes to ramp the transmit power.

10. A method, as set forth in claim 8, further comprising:

estimating said downlink channel to determine energy per bit to obtain a desired probability of intercept; and using the desired probability of intercept to set a modulation scheme of the transmitted signal.

11. A communication node associated with a network, said communication node comprising:

a scheduler to schedule a call for a wireless device in a transmission from said communication node;

a transceiver to ramp a transmit power of a transmitted signal associated with said call over a downlink channel from the communication node to the wireless device during a plurality of communication periods; and a storage coupled to said scheduler, said storage storing instructions to determine a current traffic load and estimate a future traffic load on a downlink channel over said plurality of communication periods and to adjust the transmit power of said transmission from said communication node by smoothly varying the transmit power from the first power level to a second power level across at least two communication periods of said plurality of communication periods, wherein the second power level is determined based on said current and future traffic loads.

12. A communication node, as set forth in claim 11, wherein said communication node is a base station and said transceiver is a base transceiver station.

13. A communication node, as set forth in claim 12, wherein said communication node is a base station and said network is a digital cellular network.

14. A communication node, as set forth in claim 13, wherein said base transceiver station is being defined at least in part by a Universal Mobile Telecommunication System (UMTS) protocol.

15. A communication node, as set forth in claim 13, wherein said digital cellular network is being defined at least in part by a Universal Mobile Telecommunication System (UMTS) protocol.

16. A telecommunication system comprising:

a base station associated with a digital cellular network; and a base transceiver station coupled to said base station, said base transceiver station including:

a scheduler to schedule a call for a wireless device in a transmission from said base station, a transmitter to ramp a transmit power of a transmitted signal associated with said call over a downlink channel from the base transceiver station to the wireless device during a plurality of communication periods, and a storage coupled to said scheduler, said storage storing instructions to determine a current traffic load and estimate a future traffic load on the downlink channel over said plurality of communication periods and to adjust the transmit power of said transmission from said base station by smoothly varying the transmit power from a first power level to a second power level across at least two communication periods of said plurality of communication periods, wherein the first and second power levels are determined based on said current and future traffic loads.

17. A telecommunication system, as set forth in claim 16, wherein said base transceiver station is being defined at least in part by a Universal Mobile Telecommunication System (UMTS) protocol.

18. A telecommunication system, as set forth in claim 16, wherein said storage stores an algorithm that limits a peak in the transmit power of the transmitted signal.

19. A telecommunication system, as set forth in claim 16, wherein said transmitter comprising:
   a pre-distortion unit to correct for a change in one or more characteristics of said transmitter relative to a pre-determined threshold.

20. A telecommunication system, as set forth in claim 16, wherein said transmitter comprising:
   a power amplifier that amplifies a modulated signal to provide a desired output power level for said transmission.

21. An article comprising a machine readable storage medium storing instructions that, when executed cause a system to:
   determine a current and a future traffic load on a downlink channel over a plurality of communication periods for scheduling a call for a wireless device in a transmission from a communication node associated with a network;
   examine data in said transmission of said current traffic load;
   examine impending data of said future traffic load;
   determine a rate at which said multiplicity of codes should be added to adjust a code power to smoothen out the transmit power of the transmitted signal based on said data and said impending data; and
   adjust the transmit power of said transmission from said communication node across at least two communication periods of said plurality of communication periods by adding codes at the determined rate.

22. An article, as set forth in claim 21, comprising a medium storing instructions that, when executed cause a system to:
   ramp the transmit power of a transmitted signal associated with said call over said at least two communication periods of said plurality of communication periods.

23. An article, as set forth in claim 21, comprising a medium storing instructions that, when executed cause a system to:
   specify a power limit for the transmitted signal; and
   assign a multiplicity of codes to a ramping function until the power limit is reached for the transmitted signal.

24. An article, as set forth in claim 21, comprising a medium storing instructions that, when executed cause a system to:
   cause scheduling of said call on said downlink channel to reduce a potential adverse effect on an algorithm that limits a peak in the transmit power of the transmitted signal.

25. An article, as set forth in claim 21, comprising a medium storing instructions that, when executed cause a system to:
   cause scheduling of said call on said downlink channel to reduce a potential adverse effect on a pre-distortion unit.

26. An article, as set forth in claim 21, comprising a medium storing instructions that, when executed cause a system to:
   cause scheduling of said call on said downlink channel to reduce a potential adverse effect on a power amplifier.

27. An article, as set forth in claim 26, comprising a medium storing instructions that, when executed cause a system to:
   present said power amplifier with a ramp change in the transmit power for a high speed downlink packet data access on said downlink channel to avoid an increase in a saturated power of said power amplifier and an increase in a peak-to-average power ratio.

28. An article comprising a machine readable storage medium storing instructions that, when executed cause a system to:
   determine a current traffic load and estimate a future traffic load on a downlink channel over a plurality of communication periods for scheduling a call for a wireless device in a transmission from a communication node associated with a network;
   adjust a transmit power of said transmission from said communication node across at least two communication periods of said plurality of communication periods based on said current and future traffic loads
   examine data in said transmission of said current traffic load;
   examine impending data of said future traffic load;
   determine a rate at which said multiplicity of codes should be added to adjust a code power to smoothen out the transmit power of the transmitted signal based on said data and said impending data;
   specify a power limit for the transmitted signal; and
   assign a multiplicity of codes to a ramping function until the power limit is reached for the transmitted signal.

29. An article, as set forth in claim 28, comprising a medium storing instructions that, when executed cause a system to:
   sequentially allocate said multiplicity of codes to ramp the transmit power.

30. An article, as set forth in claim 28, comprising a medium storing instructions that, when executed cause a system to:
   estimate said downlink channel to determine energy per bit to obtain a desired probability of intercept; and
   use the desired probability of intercept to set a modulation scheme of the transmitted signal.

* * * * *